United States Patent
Kodama et al.

(10) Patent No.: US 6,660,236 B1
(45) Date of Patent: Dec. 9, 2003

(54) APPARATUS FOR DECOMPOSITION AND RECOVERY OF POLYURETHANE RESIN

(75) Inventors: Katsuhisa Kodama, Nishinomiya (JP); Kouichi Murayama, Suita (JP); Takashi Kumaki, Suita (JP); Fumihiko Kasuya, Osaka (JP); Yoshiyuki Nagase, Kobe (JP); Masaaki Nakata, Osaka (JP); Satoshi Nishida, Osaka (JP)

(73) Assignees: Takeda Chemical Industries, Ltd., Osaka (JP); Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/410,029

(22) Filed: Oct. 1, 1999

(30) Foreign Application Priority Data

Nov. 30, 1998  (JP) .......................................... 10-340416

(51) Int. Cl.[7] ............................................... B01J 10/00
(52) U.S. Cl. ........................ 422/188; 422/187; 422/189
(58) Field of Search ................... 521/49–49.5; 422/234, 422/187, 188, 189, 190, 901, 131, 139

(56) References Cited

U.S. PATENT DOCUMENTS

| 3,117,940 A | 1/1964 | McElroy ..................... 521/49.5 |
| 3,120,561 A | 2/1964 | Chambret ................... 562/483 |

(List continued on next page.)

FOREIGN PATENT DOCUMENTS

| CA | 1 188 708 | 6/1985 | |
| DE | 41 28 588 | 3/1993 | |
| EP | 0 854 165 | 7/1998 | |
| GB | 991387 | 5/1965 | |
| GB | 1047101 | 11/1966 | |
| JP | 58-4735 | 1/1983 | |
| JP | 3-500264 | 1/1991 | |
| JP | 5-31000 | 2/1993 | |
| JP | 5-271328 | 10/1993 | |
| JP | 08176337 A | * 7/1996 | ............ C08J/11/10 |
| JP | 9-151270 | 6/1997 | |
| WO | WO98/34904 | 8/1998 | |

OTHER PUBLICATIONS

Perry's Chemical Engineering Handbook, 7th edition, 1997, pp. 17–1 to 17–19, 18–1 to 18–35.*

(List continued on next page.)

*Primary Examiner*—Hien Tran
*Assistant Examiner*—Jennifer A. Leung
(74) *Attorney, Agent, or Firm*—Oblon, Spivak, McClelland, Maier & Neustadt, P.C.

(57) ABSTRACT

Apparatus for decomposing a polyurethane resin and recovering the decomposed polyurethane resin as a polyamine compound and a polyol compound. The apparatus includes a first reactor that decomposes the polyurethane resin as the target compound of hydrolysis decomposition; a second reactor that hydrolyzes the decomposed target compound of decomposition with either one of supercritical water and high-temperature high-pressure water to a decomposition product mixture; a water supplier that feeds either one of supercritical water and high-temperature high-pressure water to the second reactor; and a post-processor that causes the decomposition product mixture discharged from the second reactor to be subjected to a post treatment procedure, such as dehydration, addition, distillation, separation, and liquid separation to recover the polyamine compound and the polyol compound.

9 Claims, 2 Drawing Sheets

U.S. PATENT DOCUMENTS

| | | | | |
|---|---|---|---|---|
| 3,128,310 A | | 4/1964 | Koch | 564/414 |
| 3,225,094 A | | 12/1965 | Wolf | 564/330 |
| 3,300,417 A | * | 1/1967 | McElroy | 521/49.5 |
| 3,331,876 A | | 7/1967 | Van Horn et al. | 564/414 |
| 3,632,530 A | * | 1/1972 | Kinoshita | 521/49.5 |
| 4,162,995 A | * | 7/1979 | Sheratte | 521/163 |
| 4,316,992 A | * | 2/1982 | Gerlock et al. | 521/49.5 |
| 4,336,406 A | * | 6/1982 | Gerlock et al. | 568/613 |
| 4,578,510 A | | 3/1986 | Doerr | 562/483 |
| 4,589,927 A | * | 5/1986 | Allen et al. | 134/25.1 |
| 4,605,762 A | | 8/1986 | Mandoki | 562/483 |
| 4,620,032 A | | 10/1986 | Doerr | 562/483 |
| 4,654,443 A | | 3/1987 | Marks et al. | 564/305 |
| 4,822,497 A | | 4/1989 | Hong et al. | 210/721 |
| 5,326,791 A | | 7/1994 | Saleh et al. | 521/45 |
| 5,386,055 A | | 1/1995 | Lee et al. | 562/512.2 |
| 5,457,197 A | | 10/1995 | Sifniades et al. | 540/540 |
| 5,656,757 A | | 8/1997 | Jenczewski et al. | 540/540 |
| 5,879,608 A | * | 3/1999 | Lammeck et al. | 264/239 |
| 5,906,998 A | | 5/1999 | Hoshino et al. | 521/49.5 |

OTHER PUBLICATIONS

K.C. Frisch, et al., Advances in Plastics Recycling, vol. 1, pps. 3–9, "Terminology and Methods for Recycling and Recovery," 1999.

Jetro, p. 7, "First TDA Recovery and Recycling Plant using Supercritical Water," Jul. 1998.

European Chemical News, p. 25, "Takeda/Kobe Recycling Unit Recovers TDA," Jne. 1–7, 1998.

Y. Nagase, et al., Kobe Steel Engineering Reports, vol. 47, No. 3, pps. 43–46, "Chemical Recycling Process for Waste Plastics Using Supercritical Water," Nov. 1997 (with English Version, No. 22, pps. 11–14, "Development of a Chemical Recycling Process for Waste Plastics using Supercritical Water," Apr. 1999.

U.S. Ser. No. 09/355,338 filed Aug. 5, 1999, pending.

U.S. Ser. No. 09/410,029 filed Oct. 1, 1999, pending.

* cited by examiner

APPARATUS FOR DECOMPOSITION AND RECOVERY OF POLYURETHANE RESIN

BACKGROUND OF THE INVENTION

1. Field of the Invention

The present invention relates to an industrially advantageous apparatus that chemically decomposes cut piece wastes of polyurethane resin in the molding and working process and product wastes thereof after their use, and recovers the decomposed polyurethane resin as a polyamine compound and/or a polyol compound that are the materials of the polyurethane resin.

2. Description of the Related Art

Polyurethane resin is massively used in the form of soft, semi-rigid, and rigid urethane foams in a variety of fields as the cushioning materials, for example, for sofas, beds, other furniture, and seats in vehicles and the thermal insulating materials, for example, for the refrigerators. The polyurethane resin is also used in the form of elastomers, for example, for shoe bottoms, tires, and belts. As the greater importance is placed on protection of the resources and preservation of the environment, a variety of techniques have been proposed and studied to attain the recycle and the reuse of various plastics including polyurethane resin.

Known recycling procedures of polyurethane resin are roughly classified into three; that is, the material recycling technique, the chemical recycling technique, and the energy recycling technique. One example of the material recycling technique reclaims the used polyurethane foams as the cushioning materials by means of re-bonding or compression molding. Another example crushes the used polyurethane foams and elastomers and mixes the crushed resin as a tiller with a new material. The chemical recycling technique decomposes the polyurethane resin to its raw materials or to compounds that can be used as the raw materials, and reuses the raw materials and the compounds. The chemical recycling may be attained, for example, through glycol decomposition, amine decomposition, or hydrolysis. The energy recycling technique utilizes the used polyurethane resin directly as a fuel or as an energy resource to give steam or a gaseous fuel.

The material recycling technique, however, possibly causes problems of the poor quality of resulting products and thus limits the range of application. The energy recycling technique possibly leads to environmental problems, such as generation of harmful substances through the combustion. The chemical recycling technique is, on the other hand, applicable to a wide variety of compounds to be recovered. By taking into account these merits and demerits, it has highly been demanded to develop an improved apparatus to attain the chemical recycling technique economically on the industrial base.

The glycol decomposition process or the amine decomposition process applied for the chemical recycling technique cuts the urethane bond, the biuret bond and the allophanate bond, which are relatively easily decomposable among all the bonds, such as the urethane bond, the urea bond, the biuret bond, and the allophanate bond, that are present in the polyurethane resin, by means of the glycol compound or the amine compound, thereby decomposing the polyurethane resin to low molecular weight substances and generating a liquid decomposition product. The glycol compound or the amine compound used as the decomposer, however, newly generates urethane bonds and urea bonds and is linked to the decomposition product by these bond. Such decomposition processes can thus not decompose the polyurethane resin to a polyol compound as a starting material of the polyurethane resin, and a polyamine as an intermediate compound of polyisocyanate. The recovered substances are accordingly usable for only the limited applications.

The applicant of the present invention has proposed a method of hydrolyzing polyurethane resin using high-temperature high-pressure liquid water as the decomposer (WO98/34909). This proposed technique heats polyurethane foam to decrease its volume and supplies the solid polyurethane foam of the reduced volume to hydrolysis means. A further improvement in material supply means is required to provide an efficient continuous flow apparatus for carrying out the hydrolysis of polyurethane resin on the industrial base. Problems of contaminating the reaction passage with foreign matters and blocking the reaction passage may arise, for example, in the process of recycling shredder dust of the seats in the vehicles, which is generally mixture of fibers and resin.

SUMMARY OF THE INVENTION

An object of the present invention is thus to provide an apparatus of decomposition and recovery that continuously decomposes and recovers polyurethane resin with high-temperature high-pressure water or supercritical water, which advantageously reduces the required energy cost, reduces the size of the whole apparatus, removes foreign substances from the shredder dust, and decreases the required quantities of substances for decomposition, and the like.

At least part of the above and the other related objects is realized by an apparatus for decomposing a polyurethane resin and recovering the decomposed polyurethane resin as a polyamine compound and/or a polyol compound. The apparatus includes: a first reactor that decomposes the polyurethane resin as a target compound of hydrolysis decomposition; a second reactor that hydrolyzes the decomposed target compound with either one of supercritical water and high-temperature high-pressure water to a decomposition product mixture; a water supplier that feeds of either one of supercritical water and high-temperature high-pressure water to the reactor; and a post-processor that causes the decomposition product mixture discharged from the reactor to be subjected to a post process, such as dehydration, addition, distillation, separation, and liquid separation, to recover the polyamine compound and/or the polyol compound.

The apparatus of the present invention decomposes polyurethane resin and feeds the decomposed polyurethane resin to the second reactor. This arrangement enables continuous decomposition. Compared with the prior art apparatus that hydrolyzes solid polyurethane resin in a reactor, this arrangement relieves the conditions of the hydrolysis. This advantageously decreases the water addition ratio and reduces the reaction time, thereby reducing the volume of the reactor, lowering the required level of the performance of the water supply unit, and eventually reducing the recycling cost.

These and other objects, features, aspects, and advantages of the present invention will become more apparent from the following detailed description of the preferred embodiments/examples with the accompanying drawings.

DESCRIPTION OF THE PREFERRED EMBODIMENTS

Figure 1:
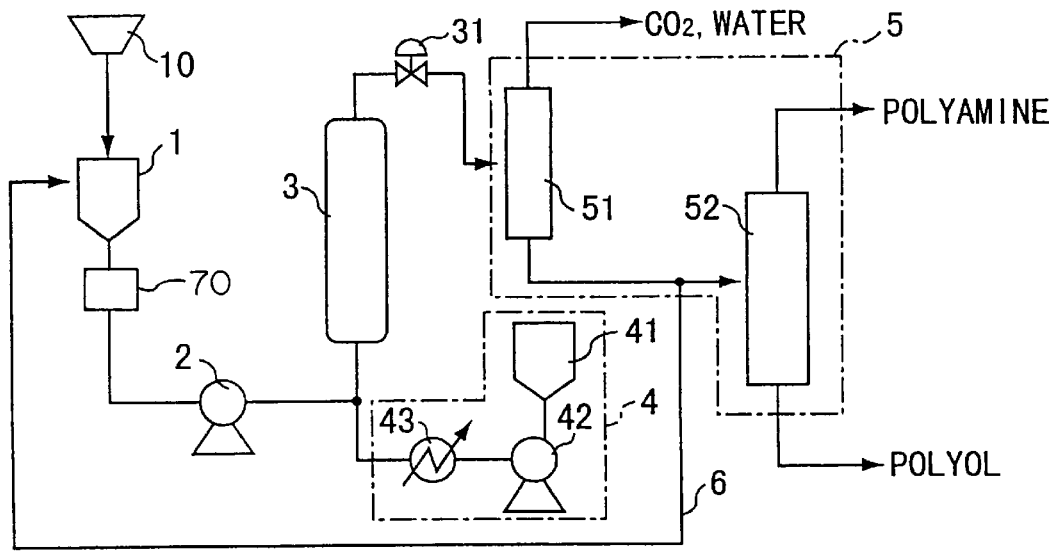
FIG. 1 is a diagram showing an apparatus for decomposition and recovery in one embodiment according to the present invention.

The apparatus of the present invention includes: a first reactor that decomposes the polyurethane resin as a target compound of hydrolysis decomposition; a second reactor that hydrolyzes the decomposed target compound with either one of supercritical water and high-temperature high-pressure water to a decomposition product mixture; a water supplier that feeds either one of supercritical water and high-temperature high-pressure water to the reactor; and a post-processor that causes the decomposition product mixture discharged from the reactor to lie subjected to a post process, such as dehydration, addition, distillation, separation, and liquid separation, and recovers the polyamine compound and/or the polyol compound.

In accordance with one preferable application, the first reactor includes a decomposition tank, in which combining a polyamine compound and the polyurethane resin causes aminolysis to thereby decompose the polyurethane resin and to produce the resulting decomposed target compound of hydrolysis decomposition. This arrangement enables the polyurethane resin to be readily decomposed by means of a polyamine compound and ensures the continuous processing. The polyamine compound obtained by the hydrolysis of the polyurethane resin may be refluxed and used for the decomposition process This effectively saves the limited resources. Instead of taking advantage of the aminolysis, the decomposition process may use a medium like a polyol compound to make the polyurethane resin slurry or use an adequate solvent to dissolve the polyurethane resin.

In accordance with another preferable application, the apparatus further includes a, filter disposed in a pathway between the first reactor and the second reactor to continuously feed the decomposed target compound of hydrolysis decomposition to the reactor. In the event that the decomposed target compound contains some foreign matters, the filter removes the foreign matters and effectively prevents the foreign matters from causing troubles, such as blocking, in the downstream portion of the apparatus including the reactor.

In accordance with still another preferable application, the apparatus further includes a reflux system that refluxes part of the decomposition product mixture from an arbitrary position downstream from the reactor with respect to the mixture feeding direction to the first reactor. The decomposition product mixture includes a polyamine compound and a polyol compound, and is refluxed to the first reactor by the reflux system, so as to be used in the aminolysis process or a medium of the process of making the slurry.

In one preferable embodiment, the post-processor has a dehydrator that removes water from the decomposition product mixture, and a separating/recovering unit that separately recovers the polyamine compound and the polyol compound from the dehydrated decomposition product mixture. The dehydrator disposed before the separating/recovering unit favorably assures the size reduction of the separating/recovering unit.

In the above structure, the reflux system may be disposed between the dehydrator and the separating/recovering unit. The liquid decomposition product mixture after the dehydration, or removal of water non-required for the decomposition is refluxed to the first reactor. This configuration enables only the decomposition product mixture required for the decomposition to be fed to the first reactor thereby assuring the size reduction of the whole apparatus and enabling the decomposition with a high efficiency.

In the above structure, it is preferable that the post-processor further include a rough separation unit disposed between the dehydrator and the separating/recovering unit to roughly divide the dehydrated decomposition product mixture into a first portion mainly composed of the polyamine compound and a second portion mainly composed of the polyol compound. The reflux system refluxes the first portion mainly composed of the polyamine compound. This arrangement causes the polyamine compound required for the decomposition to be roughly separated and refluxed to the first reactor. This also assures the size reduction of the whole apparatus and enables the decomposition with a high efficiency.

In the above configuration, the reflux system refluxes the second portion mainly composed of the polyol compound, instead of the first portion mainly composed of the polyamine compound. This arrangement is useful when the first reactor adopts the process of making the slurry.

In accordance with one preferable embodiment of the above structure, the reflux system refluxes the polyamine compound separately recovered by the separating/recovering unit. This arrangement enables the polyamine compound of the higher purity to be refluxed to the first reactor for the aminolysis with a higher efficiency, thereby enabling further size reduction of the whole apparatus.

In accordance with another preferable embodiment of the above structure, the reflux system refluxes the polyol compound separately recovered by the separating recovering unit. This arrangement enables the polyol compound of the higher purity to be refluxed to the he first reactor to make the slurry with a higher efficiency.

In accordance with still another preferable embodiment of the above structure, it is preferable that the apparatus further includes a water reflux system that refluxes water discharged from the dehydrator to the water supplier. This arrangement enables water indispensable for the hydrolysis to be recycled and thereby decreases the quantity of exhaust discharged out of the apparatus.

In accordance with still another preferable embodiment of the above-structure, the first reactor includes: a decomposition tank, in which combining a polyamine compound and the polyurethane resin causes aminolysis to thereby decompose the polyurethane resin and to produce the resulting decomposed product; and an intermediate separation tank that separates the decomposed product into a target compound of hydrolysis decomposition and a non-hydrolysis compound. The apparatus further may have a feeder that feeds the non-hydrolysis compound discharged from the intermediate separation tank to the separating/recovering unit. As the result of aminolysis in the first reactor, the decomposed product includes an urea bond-containing compound and a polyol compound. The polyol compound is, however, a target of recovery and does not require any hydrolysis. The arrangement of bypassing the reactor and passing the polyol compound directly to the separating/recovering unit favorably reduces the size of the reactor and the post-processor.

The apparatus for decomposition and recovery according to the present invention hydrolyzes polyurethane resin to useful substances for recycling. The polyurethane resin, which is the object to be decomposed, is obtained in the form of cut piece wastes and defectives in the molding and working process of the polyurethane resin products, as well as in the form of article wastes after the use in a variety of fields. The polyurethane resin includes foams, such. as flexible urethane foam, semi-rigid urethane foam, and rigid urethane foam, elastomers (cast, kneaded, and thermoplastic elastomers), RIM products, and ISF (integral-skin foams). The apparatus of the present invention can decompose any of these polyurethane resins. The apparatus can also decompose shredder dust without any problems since foreign matters included in the decomposed shredder dust are filtered out by the filter.

The apparatus of the present invention decomposes the polyurethane resin to a polyol compound and a polyamine compound, which are the raw materials of the polyurethane resin. The polyol compound and the polyamine compound are then recycled and reused as the raw materials for producing the polyurethane resin. The apparatus for decomposition and recovery according to the present invention is described more in detail with referring to the drawings.

FIG. 1 schematically illustrates an apparatus for decomposition and recovery in one embodiment according to the present invention. The apparatus includes a reactor 1, a supplier 2 for feeding a decomposed target compound of hydrolysis decomposition to a reactor 3, the reactor 3 for causing the decomposed target compound of decomposition to be brought into contact with supercritical water or high-temperature high-pressure water for hydrolysis, a filter 70, a water supplier 4 for feeding a supercritical water or high-temperature high-pressure water to the reactor 3, a post-processor 5, a reflux system 6, an introduction unit 10 for introducing polyurethane resin into the reactor one, and a pressure control valve 31.

The polyurethane resin is fed from the introduction unit 10 to the first reactor 1 by a batch process or by a flow process, The introduction unit 10 may be a hopper or a reservoir, In the event that the polyurethane resin to be decomposed is not sufficiently small pieces like shredder dust, it is preferable to cut the polyurethane resin into sufficiently small pieces with a milling machine, such as a cutter mill, a roll mill, or a hammer mill, before the polyurethane resin is stored in the introduction unit 10. A powder feeder like a rotary feeder or a belt feeder may be used to pass the small pieces of polyurethane resin to the introduction unit 10.

The first reactor 1 decomposes polyurethane resin. There are mainly three processes applicable for the decomposition. The first process causes the polyurethane resin to react with a polyamine compound and decomposes the polyurethane resin to a polyol compound and a urea bond-containing compound through the aminolysis. The second process uses a polyol compound or another liquid medium and physically stir; the polyurethane resin to a slurry. The third process dissolves the polyurethane resin in a solvent having ability to dissolve the polyurethane resin.

The first reactor 1 corresponding to one of these three processes includes a vessel for decomposing, making a slurry, or dissolving and an agitating mechanism. Concrete examples of the first reactor 1 include a tank reactor with an agitator, a horizontal reactor, a vessel rotating mixer such as a V-shaped rotating mixer or a conical mixer, and mechanical agitation blenders with ribbon-shaped or cone-shaped screws. In the case of continuous decomposition and recovery process, vessel rotating mixers, mechanical agitation blenders, and a horizontal reactor are preferably used. For example, a horizontal reactor for agitating a high viscous substance described in JAPANESE PATENT LAID-OPEN GAZETTE No. 10-342 enables decomposition with a high efficiency.

Among the three applicable processes for decomposition described above, the aminolysis is the most favorable method. The aminolysis gives a polyol compound, which is a target of recovery, prior to the hydrolysis process. The configuration of passing the polyol compound obtained by the aminolysis to the post-processor 5 enables size reduction of the units after the reactor in the apparatus. The polyamine compound produced by the hydrolysis process may be used for the aminolysis. This saves the limited resources. The presence of a little amount of a polyol compound decreases the viscosity of the reaction mixture in the first reactor. This enables the reaction to proceed homogeneously. When the aminolysis is applied for the decomposition process, the vessel of the first reactor 1 is a decomposition tank.

The polyamine compound, which is the raw material of the polyurethane resin, may be used for the aminolysis. Typical examples of the polyamine compound include tolylenediamine (TDA), diaminodiphenylmethane, polymethylpolyphenyl polyamine. The aminolysis is generally carried out at temperatures of 120 to 220° C.

The target compound of hydrolysis decomposition decomposed by the first reactor 1 is fed into the reactor 3 by means of the supplier 2, such as a pump or a screw extruder. A filter may, be disposed integrally with the first reactor 1 or in the vicinity of an exit of the first reactor 1 When the polyurethane resin to be decomposed includes foreign matters like shredder dust, it is preferable to remove the foreign matters before passing the decomposed target compound to the reactor 3, in order to prevent possible troubles like blocking. The filter may be arranged at any arbitrary position between the first reactor 1 and the reactor 3. Examples of the filter include a filter, a disc filter, and a centrifuge.

The hydrolysis is performed in the reactor 3. In the case where the target compound of hydrolysis decomposition decomposed through the aminolysis is fed into the reactor 3, the hydrolysis reaction mainly hydrolyzes the urea bond included in the urea bond-containing compound. In the case where the first reactor 1 adopts the process other than the aminolysis, on the other hand, the hydrolysis reaction hydrolyzes a variety of bonds included in the polyurethane resin.

Either supercritical water or high-temperature high-pressure water is required for the hydrolysis. The reactor 3 used should maintain water in the supercritical state or in the high-temperature high-pressure state. The water supplier 4 feeds water kept in the supercritical state or in the high-temperature high-pressure state to the reactor 3. The respective states of water are described below. In the embodiment shown in FIG. 1, the water supplier 4 comprises a water tank 41, a pump 42, and a heater 43. A heat exchanger may be used for the heater and heats water by taking advantage of a hot medium discharged after the separating/recovering process or a hot medium heated in another heater.

In another possible configuration, only the pump 42 may use as the water supplier 4 and pressurized water is introduced into a reactor with a heater by means of the pump 42. In still another possible configuration, water is introduced into a reactor with a heater and subsequently pressurized by decreasing the volume of the reactor kept in a sealed state by means of a cylinder.

The hydrolysis is carried out at temperatures of 200 to 400° C. in a specific pressure range of 3 to 30 MPa, in which water is kept in the liquid state in this temperature range. The water is preferably supplied to the reactor 3 at a temperature and pressure sufficient to ensure that the hydrolysis is carried out in the reactor 3 in the above temperature range and pressure without a heating of the reactor. Water at the temperature of 374° C. or more under 22.1 MPa or more is referred to as supercritical water. Water at the temperature in the range of 200–400° C. under the pressure in the range of 3–30 MPa other than the region of supercritical water is referred to as high-temperature high-pressure water. It is preferable to regulate the amount of water in such a manner that the decomposed target compound of hydrolysis decomposition and water are fed to the reactor at the ratio of 1:0.3 to 1:10.0 (weight ratio, hereinafter referred to as the water addition ratio). The more preferable water addition ratio (the weight of water to the weight of hydrolysis target compound) ranges from 1.0 to 5.0.

A decomposition product mixture discharged from the reactor 3 is passed to the post-processor 5 via a passage with the pressure control valve 31. In the embodiment shown in FIG. 1, the post-processor 5 has a dehydrator 51, and a separating/recovering unit 52. The dehydrator 51 is a simple distillation apparatus and the separating/recovering unit 52 is a distillation column. The decomposition product mixture contains water, carbon dioxide, a polyol compound, and a polyamine compound. The dehydrator 51 removes water and carbon dioxide, and the separating/recovering unit 52 separately recovers the polyol compound and the polyamine compound. This completes the separating recovery process of the polyurethane resin in the apparatus of the present invention.

Examples of the dehydrator 51 include a simple distillation apparatus, a flash vaporization apparatus like a flash drum, a vacuum distillation apparatus like a distillation column, an adsorption apparatus like an adsorption column, and a dryer. In the case of using the flash vaporization apparatus, the reactor 3 has a high internal pressure, so that only a pressure decreasing operation, for example, an operation of passing the decomposition product mixture to the atmospheric pressure in the flash vaporization apparatus with the pressure control valve 31, implements dehydration of the decomposition product mixture.

Examples of the separating/recovering unit 52 include a simple distillation apparatus, a vacuum distillation apparatus like a distillation column, a thin-film evaporator, and apparatuses for degasification, extraction, centrifugation, filtration, squeeze, and fractionation. The post-processor 5 may further include an addition unit, such as a reactor for a chemical reaction, (a reactor for adding alkylene oxide to the polyamine compound and recovering a polyol compound) and a liquid separation unit, which may be used alone or in combination with the dehydrator 51 and the separating/recovering unit 52. The respective treatment may be performed under reduced pressure or under pressure. Any of the post-processor 5 may include a plurality of apparatuses and units. In the case of using a distillation column as the separating/recovering unit 52, the polyamine compound is recovered as a light weight fraction from the top of the column, while the polyol compound is recovered as a heavy weight fraction from the bottom of the column.

In the embodiment shown in FIG. 1, the reflux system 6 is disposed between the dehydrator 51 and the separating/recovering unit 52 to reflux the dehydrated decomposition product mixture to the first reactor 1. The reflux system 6 is for example, a reflux conduit with a valve. The reflux system 6 is not necessarily located between the dehydrator 51 and the separating/recovering unit 52, but may be disposed at any arbitrary position downstream from the reactor 3 with respect to the decomposition product mixture feeding direction. In the case where the aminolysis is applied for decomposition of the polyurethane resin, it is necessary to contain the polyamine compound in the refluxed fluid, and the reflux fluid may or may not contain water and the polyol compound, In order to attain the high efficiency of aminolysis, however, it is not desirable to dilute the reaction mixture excessively. Refluxing the non-required medium in the apparatus makes the whole apparatus undesirably bulky, so that the reflux system 6 is preferably arranged downstream the dehydrator 51.

Figure 2:
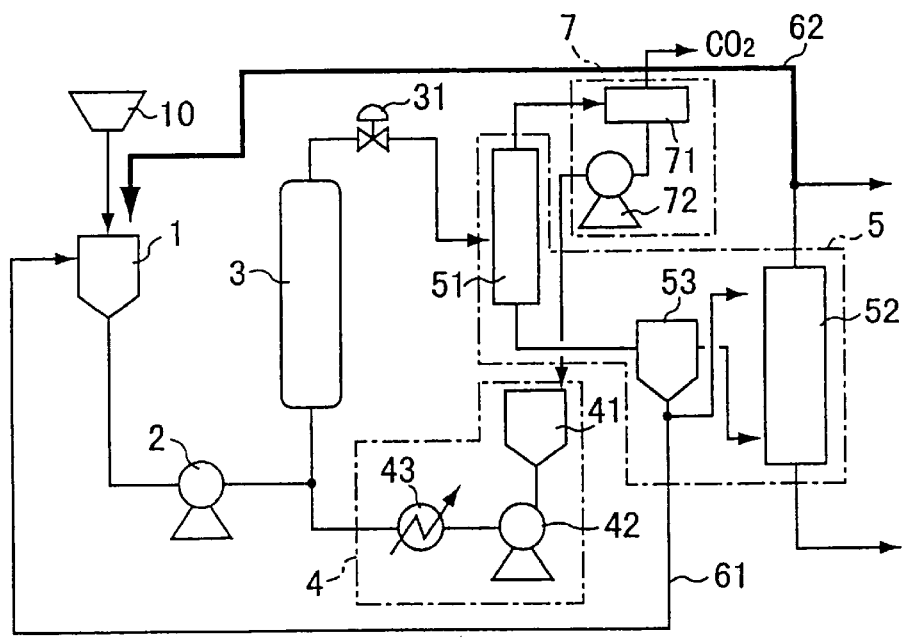
FIG. 2 is a diagram showing another apparatus for decomposition and recovery in another embodiment according to the present invention.

FIG. 2 illustrates another apparatus for decomposition and recovery in another embodiment according to the present invention. The same constituents as those in FIG. 1 are shown by the same numerals. In this embodiment of FIG. 2, the post-processor 5 has a rough separation unit 53, which is a centrifuge and is disposed between the dehydrator 51 and the separating/recovering unit 52. The rough separation unit 53 roughly divides the dehydrated decomposition product mixture into a polyamine compound-rich first portion and a polyol compound-rich second portion. For the reduced running cost of the whole apparatus, the rough separation unit 53 preferably has a low energy cost and does not require heating. Preferable examples of the rough separation unit 53 include a tubular or decanter-type centrifugal settling classifier, a liquid cyclone, a film separator, and a tank for still standing separation. Especially preferable is the technique of utilizing the fact that the polyamine compound has a greater specific gravity than the polyol compound for separation, that is, the centrifugal settling classifier, the liquid cyclone, and the tank for still standing separation. The polyamine compound-rich first portion is discharged from the lower part of such rough separation unit 53. In the event that a distillation column is used for the separating/recovering unit 52, it is preferable to feed the polyamine compound-rich first portion to an upper half of the distillation column. This reduces the required size of the distillation column and the energy cost.

In the embodiment shown in FIG. 2, a reflux system 61 refluxes the polyamine compound-rich first portion discharged from the rough separation unit 53 to the first reactor 1. Another reflux system 62 may be disposed in place of or in addition to the reflux system 61. The reflux system 62 refluxes part of the polyamine compound discharged from the separating/recovering unit 52 to the first reactor 1. In the event that a distillation column is used for the separating/recovering unit 52, the polyamine compound recovered from the top of the distillation column and the polyamine compound-rich substance taken out of the upper half of the distillation column may be refluxed through the reflux system 62.

Refluxing the polyamine compound purified by the separating/recovering unit 52 with a certain energy cost to the first reactor 1 for the aminolysis wastes the energy. Refluxing the polyamine compound of higher purity is preferable, on the other hand, in order to attain the high efficiency of the aminolysis, Either one of or both of the reflux systems 61 and 62 may thus be applied according to the requirements. Either of the reflux systems 61 and 62 refluxes the polyamine compound-rich substance obtained by the removal of water and the polyol compound, which are not required for the aminolysis, with a low energy cost. This arrangement favorably reduces the quantities of water and the polyol compound from the reflux fluid, thereby reducing the size of the whole apparatus and the running cost, In the event that the process of making the slurry with the polyol compound is applied for the decomposition, the reflux system 61 may be disposed at an upper outlet of the rough separation unit 53 or alternatively at the bottom of the separating/recovering unit 52, in order to reflux the polyol compound-rich substance.

In the embodiment of FIG. 2, a water reflux system 7 includes a condenser 71 and a feeding device like a pump 72. Water discharged from the dehydrator 51 is condensed by the condenser 71 and refluxed to a water tank 41 by the feeding pump 72. Water used for the hydrolysis may contain the polyamine compound and the polyol compound, since water contain the polyamine compound and the polyol compound dose not adversely affect the hydrolysis. Recycling the water discharged from the dehydrator 51 decreases the quantity of water discharged out of the apparatus and thus advantageously reduces the consumption of water.

Figure 3:
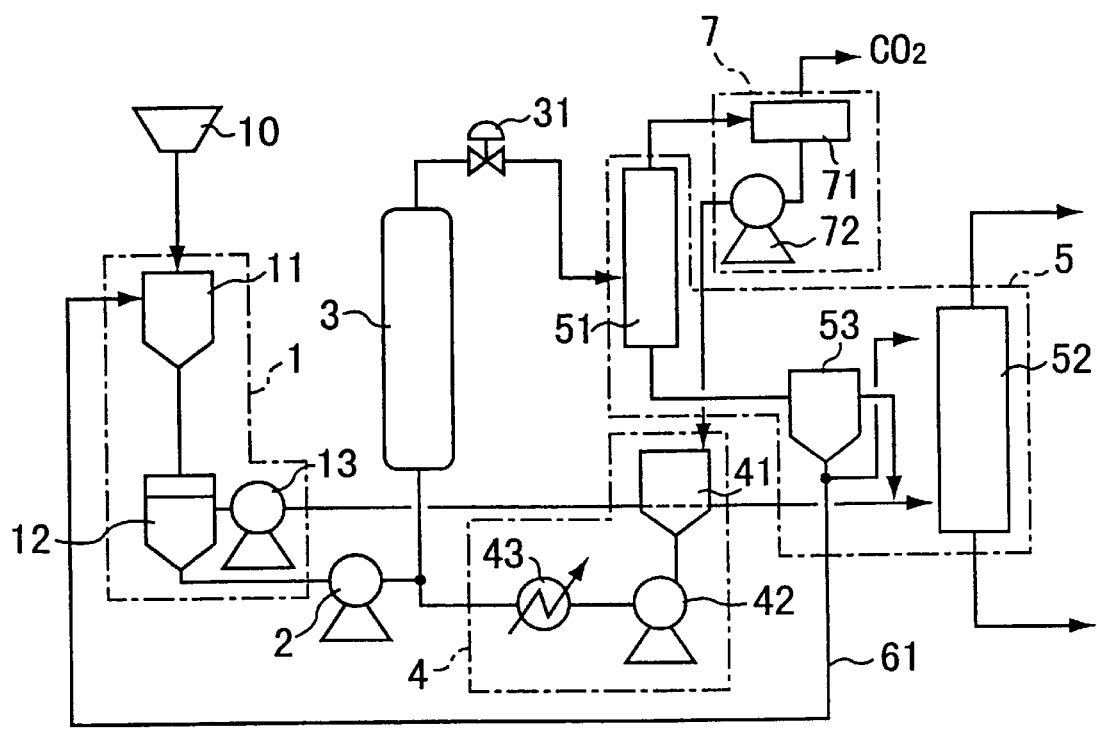
FIG. 3 is a diagram showing still another apparatus for decomposition and recovery in still another embodiment according to the present invention.

FIG. 3 illustrates still another apparatus for decomposition and recovery in still another embodiment according to the present invention. In the embodiment of FIG. 3, the first reactor 1 is a decomposition tank 11 and an intermediate separation tank 12 that separates the decomposed product discharged from the decomposition tank 11 into a target compound of hydrolysis decomposition and a non-hydrolysis compound. In the case where the aminolysis is applied for the decomposition process, the decomposed product (the discharge from the decomposition tank 11) mainly contains a polyol compound and an urea bond-containing compound. The polyol compound is a target of recovery and does not require the hydrolysis. The intermediate separation tank 12 separates the polyol compound as the non-hydrolysis compound from the urea bond-containing compound as the target compound of hydrolysis decomposition. This arrangement advantageously reduces the size of the whole apparatus including the reactor and the energy cost.

The intermediate separation tank 12 may be a tubular or decanter-type centrifugal settling classifier, a liquid cyclone, or a tank for still standing separation, which are exemplified as the rough separation unit 53, since the strict separation is not required here. A filter may be disposed at an inlet of the intermediate separation tank 12. The non-hydrolysis compound discharged from the intermediate separation tank 12 is directly fed to the separating/recovering unit 52 by a feeder 13 like a pump for the separation and purification. The hydrolysis target compound mainly composed of the urea bond-containing compound is passed to the reactor 3 via the supplier 2.

The apparatus for decomposition and recovery according to the present invention has been described with reference to FIGS. 1 to 3. The apparatus of the present invention is, however, not restricted to the configurations of these embodiments, but may be modified without departing from the scope and the spirit of the present invention.

The present invention is further described with some examples.

EXAMPLE 1 TO 3

A mixture of polypropylene triol ("Actcol 79-56" manufactured by Takeda Chemical Industries, Ltd., molecular weight 3000, hereinafter abbreviated to PPG) and tolylene diisocyanate ("Takenate 80" manufactured by Takeda Chemical Industries, Ltd., hereinafter abbreviated to TDI) was polymerized and foamed to a soft polyurethane foam. The soft polyurethane foam thus obtained had the density of 25 kg/m$^3$.

A decomposition and recovery experiment was carried out for the soft polyurethane foam with the apparatus for decomposition and recovery shown in FIG. 1. In the experiment, the soft polyurethane foam was cut into small pieces, and the small pieces of the foam were charged into a hopper (the introduction unit 10), and introduced a fixed quantity of the polyurethane foam into a tank reactor with an agitator (the first reactor 1). An equal-volume solution mixture of tolylenediamine (TDA) and PPG (for decreasing the viscosity of the reaction mixture) was added six times by weight to the fixed quantity of the polyurethane foam and stirred for one hour at 170° C. The polyurethane foam was then completely liquefied and decomposed, the progress of the aminolysis was confirmed.

The decomposed product was then fed to the reactor 3 by means of a pump (the supplier 2), while high-temperature high pressure water, which was passed from the water tank 41, pressurized by the pressure pump 42, and heated by the beater 43, was fed to the reactor 3. The decomposed product was brought into contact with the high-temperature high-pressure water in the reactor 3 for hydrolysis. The conditions of the hydrolysis are shown in Table 1 The water addition ratio denotes the weight ratio of the high-temperature high-pressure water to the hydrolysis target compound included in the decomposed product.

The decomposition product after hydrolysis was discharged from the reactor 3, and the pressure thereof was decreased to the atmospheric pressure with the pressure control valve 31. The product under the atmospheric pressure was passed to a simple distillation column (the dehydrator 51), and removed water and carbon dioxide, The dehydrated substance (TDA and the polyol) was recovered from the bottom of the simple distillation column. The experiment did not use a distillation column (the separating/recovering unit 52) but determined the quantity of IDA included in the recovered substance by gas chromatography. The quantity of TDA recovered from the polyurethane foam was calculated by subtracting the quantity of TDA used for the decomposition from the quantity of TDA thus determined. The recovery rate was calculated according to an equation given below. The results of the calculation are shown in Table 1.

Recovery rate of TDA [%]=100×(recovered quantity of TDA [mole]/quantity of TDI for synthesis of polyurethane foam [mole])

TABLE 1

| | Temperature (° C.) | Pressure (MPa) | Water addition ratio (wt/wt) | Recovery rate of TDA (%) |
|---|---|---|---|---|
| Ex. 1 | 250 | 12 | 1.0 | 90 |
| Ex. 2 | 250 | 12 | 1.8 | 99 |
| Ex. 3 | 250 | 12 | 3.0 | 98 |

EXAMPLE 4

A decomposition and recovery experiment was carried out for the polyurethane foam produced in Example 1 with the apparatus used in Example 1. In the experiment, the soft polyurethane foam was cut into small pieces, and the small pieces of the foam were charged into a hopper (the introduction unit 10), and introduced a fixed quantity of the polyurethane foam into a tank reactor with an agitator (the first reactor 1). The decomposed and recovered substance obtained in Example 2 was added ten times by weight to the fixed quantity of the polyurethane foam and stirred for one hour at 170° C. The polyurethane foam was then completely liquefied and decomposed, the progress of the aminolysis was confirmed.

The decomposed product was hydrolyzed in the same manner as Example 1, except conditions shown in Table 2 were applied for the hydrolysis. The decomposed and recovered substance was obtained through the dehydration (simple distillation) process. The recovery rate of TDA (%) is shown in Table 2.

TABLE 2

| Temperature (° C.) | Pressure (MPa) | Water addition ratio (wt/wt) | Recovery rate of TDA (%) |
| --- | --- | --- | --- |
| 250 | 12 | 1.8 | 97 |
| 270 | 15 | 1.8 | 99 |

EXAMPLE 5

A decomposition and recovery experiment was carried out for the polyurethane foam produced in Example 1 with the apparatus used in Example 1. In the experiment, the soft polyurethane foam was cut into small pieces, and the small pieces of the foam were charged into a hopper (the introduction unit 10), and were introduced a fixed quantity of the polyurethane foam into a tank reactor with an agitator (the first reactor 1). TDA was then added three times by weight to the fixed quantity of the polyurethane foam and stirred for one hour at 180° C. for the aminolysis.

The decomposed product was hydrolyzed in the same manner as Example 1, except conditions shown in Table 3 were applied for the hydrolysis. The decomposed and recovered substance was obtained through the dehydration (simple distillation) process. The recovery rate of TDA (%) is shown in Table 3.

TABLE 3

| Temperature (° C.) | Pressure (MPa) | Water addition ratio (wt/wt) | Recovery rate of TDA (%) |
| --- | --- | --- | --- |
| 260 | 16 | 1.8 | 99 |

Example 6

A decomposition and recovery experiment was carried out for the polyurethane foam produced in Example 1 with the apparatus used in Example 1. In the experiment, the soft polyurethane foam was cut into small pieces, and the small pieces of the foam were charged into a hopper (the introduction unit 10), and were introduced a fixed quantity of the polyurethane foam into a tank reactor with an agitator (the first reactor 1). The decomposed and recovered substance after the dehydration process obtained in Example 5 was further subjected to simple distillation under the conditions of 15 Torr (2000 Pa) and 160° C. The resulting liquid substance having the TDA concentration of 95% was recovered and added four times by weight of the fixed quantity of the polyurethane foam in the reactor and stirred for one hour at 180° C. for the aminolysis.

The decomposed product was hydrolyzed in the same manner as Example 1, except conditions shown in Table 4 were applied for the hydrolysis. The decomposed and recovered substance was obtained through the simple distillation process. The recovery rate of TDA (%) is shown in Table 4.

TABLE 4

| Temperature (° C.) | Pressure (MPa) | Water addition ratio (wt/wt) | Recovery rate of TDA (%) |
| --- | --- | --- | --- |
| 260 | 16 | 1.8 | 98 |

EXAMPLE 7

A decomposition and recovery experiment was carried out for the polyurethane foam produced in Example 1 with the apparatus used in Example 1. In the experiment, the soft polyurethane foam was cut into small pieces, and the small pieces of the foam were charged into a hopper (the introduction unit 10), and were introduced a fixed quantity of the polyurethane foam into a tank reactor with an agitator (the first reactor 1). The decomposed and recovered substance after the dehydration process obtained in Example 5 was further subjected to simple distillation under the conditions of 15 Torr (2000 Pa) and 160° C. for recovery of polypropylene glycol. The polypropylene glycol was added to the polyurethane foam in the reactor and mechanically stirred to make the polyurethane foam slurry. The slurry was hydrolyzed in the same manner as Example 1, except conditions shown in Table 5 were applied for the hydrolysis. The decomposed and recovered substance was obtained through the simple distillation process. The recovery rate of TDA (C) is shown in Table 5.

TABLE 5

| Temperature (° C.) | Pressure (MPa) | Water addition ratio (wt/wt) | Recovery rate of TDA (%) |
| --- | --- | --- | --- |
| 280 | 20 | 3.0 | 98 |

As described above, the apparatus for decomposition and recovery according to the present invention decomposes polyurethane resin and recovers the decomposed polyurethane as a polyamine compound or a polyol compound, which are the raw materials of the polyurethane resin. The polyurethane resin is decomposed before being subjected to hydrolysis. This configuration enables the continuous processing and facilitates the removal of foreign matters. Compared with the prior art apparatus that hydrolyzes solid polyurethane resin in a reactor, this arrangement advantageously decreases the water addition ratio and reduces the reaction time, thereby reducing the volume of the reactor, lowering the required level of the performance of the water supplier, and eventually reducing the recycling cost.

Application of the aminolysis for the decomposition process enables part of polyamine compound produced through the hydrolysis to be recycled. Separation of the polyol produced through the aminolysis prior to the hydrolysis process ensures the size reduction of the whole apparatus and favorably decreases the running cost.

The present invention is not restricted to the above embodiments/examples or their modifications, but there may be many other modifications, changes, and alterations without departing from the scope or spirit of the main characteristics of the present invention.

The scope and spirit of the present invention are limited only by the terms of the appended claims.

What is claimed is:

1. An apparatus for decomposing a polyurethane resin and recovering a polyamine compound and a polyol compound from the decomposed polyurethane resin, the apparatus comprising:

a first reactor that decomposes the polyurethane resin via aminolysis to form a target compound for hydrolysis, wherein said aminolysis is caused by combining the polyurethane resin with a polyamine compound to decompose the polyurethane resin into the target compound;

a second reactor that hydrolyzes the target compound formed in the first reactor with either one of supercritical water or high-temperature high-pressure water to produce a decomposition product mixture;

a filter disposed in a pathway between the first reactor and the second reactor, said pathway for feeding the target compound formed in the first reactor to the second reactor, a water supplier that feeds said either one of supercritical water or high-temperature high-pressure water to said second reactor;

a post-processor that recovers a polyamine compound and a polyol compound from the decomposition product mixture discharged from the second reactor; and a reflux system that refluxes a part of the recovered polyamine compound from a position downstream of the second reactor to the first reactor.

2. The apparatus according to claim 1, wherein said post-processor comprises:

a dehydrator that removes water from the decomposition product mixture discharged from the second reactor to form a dehydrated decomposition product mixture; and a separating/recovering unit that separately recovers the polyamine compound and the polyol compound from the dehydrated decomposition product mixture.

3. The apparatus according to claim 2, further comprising a water reflux system that refluxes water discharged from said dehydrator to said water supplier.

4. The apparatus according to claim 2, wherein the location of said reflux system at said position downstream of the second reactor is between said dehydrator and said separating/recovering unit.

5. The apparatus according to claim 2, wherein said post-processor further comprises:

a separation unit located between said dehydrator and said separating/recovering unit to divide the dehydrated decomposition product mixture into a first portion mainly composed of the polyamine compound and a second portion mainly composed of the polyol compound; and said reflux system refluxes the first portion mainly composed of the polyamine compound.

6. The apparatus according to claim 2, wherein said post-processor further comprises:

a separation unit located between said dehydrator and said separating/recovering unit to divide the dehydrated decomposition product mixture into a first portion mainly composed of the polyamine compound and a second portion mainly composed of the polyol compound; and said reflux system refluxes the second portion mainly composed of the polyol compound.

7. The apparatus according to claim 2, wherein said reflux system refluxes the polyamine compound recovered by said separating/recovering unit.

8. The apparatus according to claim 2, wherein said reflux system refluxes the polyol compound recovered by said separating/recovering unit.

9. The apparatus according to claim 2, wherein said first reactor comprises:

a decomposition tank that combines the polyurethane resin with the polyamine compound to form a decomposed compound by means of aminolysis; and an intermediate separation tank that separates the decomposed compound into the target compound for hydrolysis and a non-hydrolysis compound;

said apparatus further comprising a feeder that feeds the non-hydrolysis compound discharged from said intermediate separation tank to said separating/recovering unit.

* * * * *